April 16, 1935.   L. M. THOMAS   1,998,031
HANDY FLORAL STAKE
Filed Feb. 1, 1934
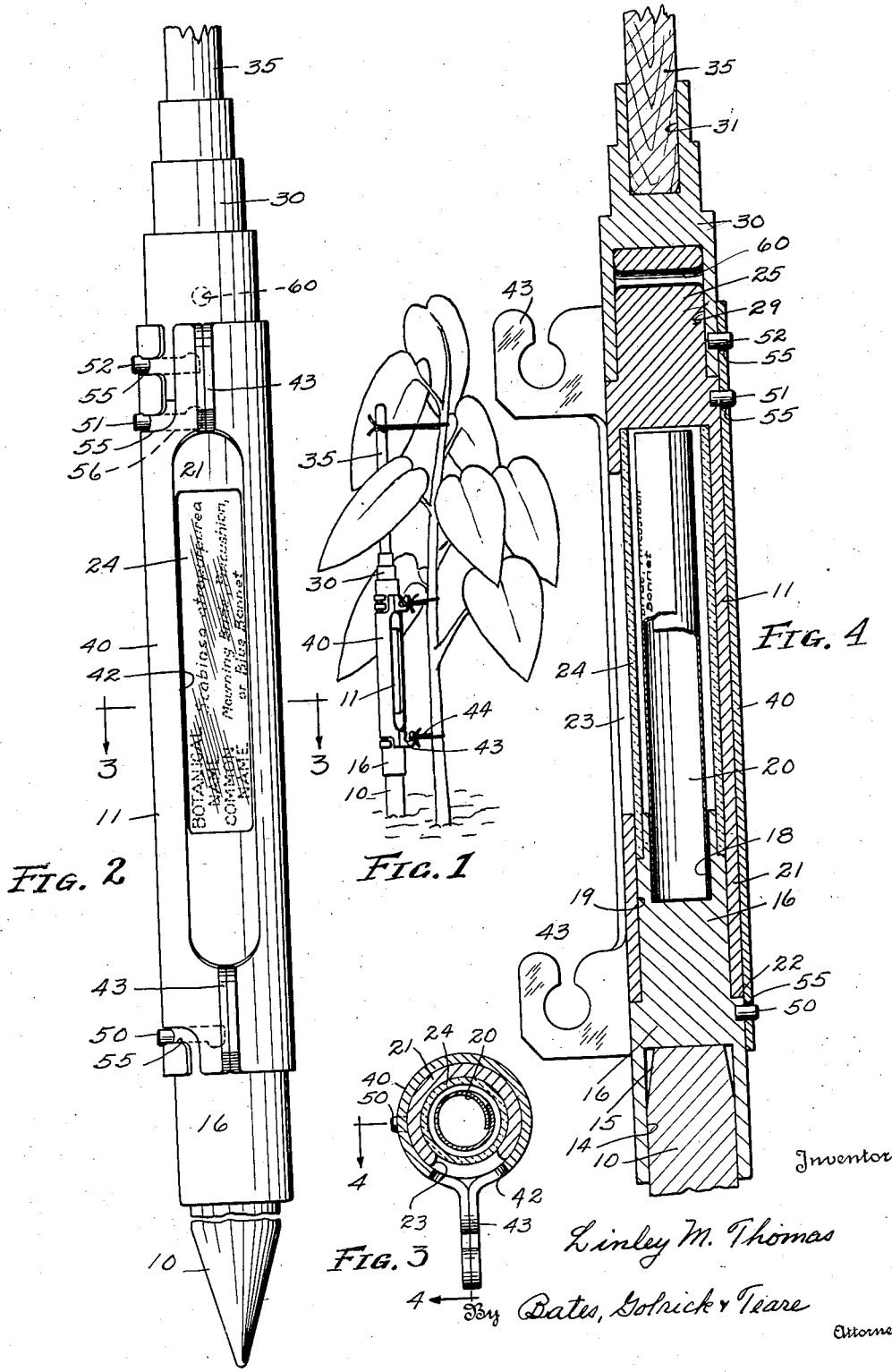

Patented Apr. 16, 1935

1,998,031

UNITED STATES PATENT OFFICE 1,998,031

HANDY FLORAL STAKE

Linley M. Thomas, Cleveland Heights, Ohio

Application February 1, 1934, Serial No. 709,265

6 Claims. (Cl. 40—19)

This invention relates to improvements in a floral stake and marker, particularly to a floral stake which may serve as a marker to designate the name of the plant or other botanical information, such as records concerning the plant, and stake which will also serve as a post to which the plant may be secured for support of the bloom and for the protection of the plant from the wind and other disturbances. This, therefore, is the general object of the invention.

A further object is to provide a combined plant marker and stake so arranged that the marker is protected from the elements and is readily removable from the stake base.

Other objects of the invention will become more apparent from the following description, which refers to a preferred form of the invention, shown in the accompanying drawing. The essential characteristics of the invention will be summarized in the claims.

Referring again to the drawing, wherein I have illustrated a preferred form of my invention, Fig. 1 is an elevational view illustrating my improved marker and stake; Fig. 2 is enlarged fragmentary elevations of my improved stake and marker; Fig. 3 is a horizontal section, as indicated by the line 3—3 on Fig. 2; Fig. 4 is a vertical section, as indicated by the offset-lines 4—4 on Fig. 3.

Referring again to the drawing, 10 indicates an elongated pointed rod or stake adapted to be inserted or driven into the earth beside the flower or plant. The stake is preferably circular in cross-section and extends a sufficient distance above the surface of the soil to permit the telescopic attachment thereto of a marker member 11. The lower end of the marker section of the post or stake is provided with an axial opening 14 arranged to coact with the upper end of the stake 10. Preferably, the sides of the stake adjacent the extreme upper end are bevelled as at 15, to enable the driving of the stake into hard soil, without danger of the increase in cross-sectional area of the stake, due to pounding, preventing the positioning of the marker member 11.

The marker 11 preferably comprises an opaque tubular member 21, open at its base to receive a socket or closure member 16, the lower end of which is provided with the axial opening 14 heretofore mentioned, and the upper end of which is provided with an axial opening or pocket 18 arranged to receive the lower end of a removable paper strip, as is shown in Figs. 3 and 4, at 20. The strip 20 is rolled in the form of a cylinder and extends upwardly some distance from the upper edge of the socket member 16. The upper portion of the socket member 16 is provided with a reduced portion 19 to telescopically receive the tubular member 21 which, when in position on the socket member, contacting with an annular rim or seat 22 thereof, provides a substantially continuous structure. The tubular member 21 extends some distance upwardly from the socket member 16 and is provided with an opening 23 in the side wall thereof to facilitate the reading of the data on the marker member 20 without necessitating the removal of any of the parts.

To protect the marker from moisture I prefer to insert a glass or other transparent member 24 in the tube 21. The tube 21 may readily be made of a composition material, such as a phenol condensate or similar product, in which case the transparent member 24 may comprise a glass tube and may be positioned during the molding of the member 21, thus forming a waterproof joint between the glass and the tube 21. However, when metal is used in the construction of the member 21, I prefer to cement the glass in position in the member 21 with a suitable waterproof cement.

The upper end of the member 21 is preferably closed or solid to prevent moisture from entering the structure, and is provided with a reduced portion 25 arranged to telescopically coact with a recess 29 in a socket member 30, which is similar in all respects to the socket member 16, heretofore mentioned.

A recess 31 in the upper end of the socket member 30 telescopically coacts with a suitable rod or pole 35, to which the upper portions of the plant may be tied, as desired.

As the marker is often exposed to the direct rays of the sun, it sometimes causes the obliteration of the data on the marker. I therefore provide a shell or band 40 preferably made of pressed metal which rotatably encircles the member 21. The band 40 is provided with an opening 42 in its side wall, such opening being slightly larger than the opening 23 of the tube 21. Hence, if the member 40 is rotated about the tube 21, it will close or open the opening 23 of the tube, as desired.

The member 40 also acts to support the plant as shown in Figs. 1 and 4. The member 40 is provided with a pair of outwardly extending ears 43 formed in the nature of hooks to enable the lower portion of the plant to be readily secured thereto by suitable cords 44.

The member 40 serves to lock the various parts together. As shown, the lower socket member 16 is provided with a pin 50 extending outwardly from its periphery. The upper end of the member 21 is provided with a similar pin 51 and the lower portion of the socket member 29 is provided with a pin 52. The member 41 is provided with slots 55, which coact with their respective pins in a bayonet locking lock fashion, so that the socket members and the marker member may be readily secured together by rotation of the member 40. As indicated in the drawing at 56, each slot 55 is of sufficient length to permit the turning of the member 40 to cover or uncover the opening 23 in the sleeve 21 without the danger of unlocking the parts.

From the foregoing description it will be seen that I have provided a sectional floral stake or marker which is readily assembled as a telescopic post and which may be readily removed from its supporting stake. Likewise, the pole 31 may be removed and the unit tied directly to a tree or to the bulb for winter storage by passing a suitable cord through the opening 60 in the marker member.

I claim:

1. A floral marker comprising an opaque hollow member having an opening in its side wall, closure means for the ends of said member, a transparent covering for the opening in the wall of said hollow member, and means movably embracing said member to cover or uncover the opening therein as desired.

2. A floral marker comprising an opaque elongated hollow member having an opening in its side wall and an opening in one of its end walls, closure means for the opening in the end of said member, a transparent covering for the opening in the wall of said hollow member, means movably embracing said member to cover or uncover the opening therein as desired, and means including said movable means to lock the first-named closure member in position on the hollow member.

3. A floral marker comprising an opaque tubular member having an opening in its side wall and one end, a transparent closure member for the opening in the side wall of said tube, a closure for the opening in the end of said tube, said last-named closure member having a socket portion extending upwardly into the tubular member and a second socket portion extending downwardly from the tubular member, a marker carried by said first-named socket and visible through the opening in side wall of the tubular member, and a stake adapted to be set in the earth and projecting upwardly into the downwardly extending socket portion of said closure member.

4. A floral marker comprising an opaque tubular member having an opening in its side wall and one open end, a transparent tubular member within said opaque member and closing the opening in the side wall of said opaque tubular member, a closure for the opening in the end of said opaque tubular member, said last-named closure member coacting with the lower edges of both of said tubular members and having a socket extending upwardly into the last-named tubular member, a marker carried by said first-named socket and visible through the opening in the side wall of said opaque member, a stake adapted to be set in the earth, and a telescopic removable connection between the stake and said socket member.

5. A combined floral stake and marker comprising a stake member adapted to be inserted in the ground, a socket member telescopically secured to the upper end of said stake, a hollow member having an opening in its side wall telescopically secured to said socket member, transparent closure means for said opening, a marker within said hollow member and visible through the opening therein, and a second socket member telescopically secured to the upper end of said hollow member and arranged to removably receive a stake extension member.

6. A combined floral stake and marker comprising a stake member adapted to be inserted in the ground, a socket member telescopically secured to the upper end of said stake, a hollow member having an opening in its side wall and an opening in one end wall, said hollow member being axially aligned with and telescopically secured to said socket member, a transparent closure means for the opening in the side wall of said hollow member, a marker within said hollow member and visible through the opening therein, said marker being removable as a unit with said socket member, a movable opaque closure member to selectively cover and uncover the opening in said hollow member, a second socket member telescopically secured to the upper end of said hollow member, and arranged to receive a stake extension and means engaged by said closure member to lock the two socket members and the hollow member together.

LINLEY M. THOMAS.